United States Patent
Ouni et al.

(10) Patent No.: US 12,404,457 B2
(45) Date of Patent: Sep. 2, 2025

(54) PROCESS FOR PURIFYING PYROLYZED PLASTIC WASTE

(71) Applicant: Borealis AG, Vienna (AT)

(72) Inventors: Tuomas Ouni, Kulloo (FI); Kilian Piettre, Linz (AT); Ammar Abdull Makic, Linz (AT)

(73) Assignee: BOREALIS AG, Vienna (AT)

( * ) Notice: Subject to any disclaimer, the term of this patent is extended or adjusted under 35 U.S.C. 154(b) by 239 days.

(21) Appl. No.: 17/923,028

(22) PCT Filed: May 25, 2021

(86) PCT No.: PCT/EP2021/063832
§ 371 (c)(1),
(2) Date: Nov. 3, 2022

(87) PCT Pub. No.: WO2021/239699
PCT Pub. Date: Dec. 2, 2021

(65) Prior Publication Data
US 2023/0159836 A1  May 25, 2023

(30) Foreign Application Priority Data
May 26, 2020 (EP) .................................. 20176576

(51) Int. Cl.
*B01J 23/42* (2006.01)
*C10G 1/00* (2006.01)

(52) U.S. Cl.
CPC ..... *C10G 1/002* (2013.01); *C10G 2300/1003* (2013.01)

(58) Field of Classification Search
CPC ............ C10G 1/002; C10G 2300/1003; C10G 25/003; C10G 45/10; C10G 67/06; C10G 1/10; B01J 23/42; B01J 37/18; C10B 53/07; Y02P 20/143
USPC .......................................................... 585/241
See application file for complete search history.

(56) References Cited

U.S. PATENT DOCUMENTS 3,852,207 A * 12/1974 Stangeland ............ C10G 45/52
                                                         208/18
4,816,138 A    3/1989 Visser et al.
4,982,027 A    1/1991 Korff et al.
6,150,577 A * 11/2000 Miller ...................... C10G 1/10
                                                         585/734
2012/0310023 A1  12/2012 Huang et al.
2013/0338411 A1* 12/2013 Sharma .................. C10G 1/002
                                                         44/281
2014/0275667 A1  9/2014 Sarker
2022/0402006 A1* 12/2022 Wu .......................... C10B 57/02

FOREIGN PATENT DOCUMENTS

CN       109337709 A    2/2019
EP        0291698 A1   11/1988
WO     2021024818 A1   10/2021

OTHER PUBLICATIONS

First Examination Report of Application No. 21728222.7 Dated Jan. 25, 2024.
Vasile, et al, "Feedstock recycling from plastics and thermosets fractions of used computers. II/ Pyrolysis oil upgrading" ScienceDirect Fuel vol. 86 No. 4, Nov. 6, 2006 pp. 477-485.
Authors: Cornelia Vasile • Mihai Adrian Brebu Tammer Karayildirim • Jale Yanik • Hristea Darie; Title: Feedstock recycling from plastic and thermoset fractions of used computers (I): pyrolysis—(Magazine) J Mater Cycles Waste Management Methods (2006) Accepted: Jan. 25, 2006 pp. 1-10; DOI 10.1007/s10163-006-0151-z.
Brazilian Office Action Application No. BR112022024049.0.
Sricharoenchaikul, Viboon, et al. "Preparation and Characterization of Activated Carbon from the Pyrolysis of Physic Nut (*Jatropha curcas* L.) Waste" Department of Environmental Engineering, Faculty of Engineering, Chulalongkorn University, May 28, 2007.

* cited by examiner

*Primary Examiner* — Prem C Singh
*Assistant Examiner* — Francis C Campanell
(74) *Attorney, Agent, or Firm* — Lippes Mathias LLP

(57) ABSTRACT

The present invention relates to a process for purifying a pyrolyzed plastic waste, the process comprising the steps of providing the pyrolyzed plastic waste, wherein the pyrolyzed plastic waste is a liquid or a wax at 20° C. and 1 atm, contacting the pyrolyzed plastic waste with activated carbon yielding a pretreated 5 plastic waste and hydrogenating the pretreated plastic waste using hydrogen and a metal-based catalyst yielding a hydrogenated plastic waste suitable for steam cracking.

15 Claims, No Drawings

PROCESS FOR PURIFYING PYROLYZED PLASTIC WASTE

CROSS REFERENCE TO RELATED APPLICATIONS

This is a 371 of PCT Application No. PCT/EP2021/063832, filed May 25, 2021, which claims the benefit of European Application No. 20176576.5, filed May 26, 2020, the contents of which are incorporated herein in their entirety.

The present invention relates to a process for purifying a pyrolyzed plastic waste, especially a pyrolyzed plastic waste that is a liquid or a wax at 20° C. and 1 atm.

BACKGROUND

State of the art pyrolyzation of plastic waste is typically conducted at temperatures in the range of 350-600° C. and at a residence time sufficiently to split the long polymer chains into smaller fragments. In case of plastic waste that is based on or produced from polyolefins and/or polyvinylchloride, the resulting product is a mixture of different hydrocarbon fragments. Depending on the process conditions, said plastic waste is convertible to a liquid product that can be used as a feedstock for steam crackers.

Such processes are basically known in the prior art. The US patent application US 2016/0264874 A1 for example discloses a process for the conversion of waste plastics to high value products. The process allows for operation with a single hydroprocessing reactor which provides simultaneous hydrogenation, dechlorination, and hydrocracking of components of a hydrocarbon stream to specifications which meet steam cracker requirements, with the option to further dechlorinate the treated hydrocarbon stream in a polishing zone.

In PCT application WO 2018/025103 A1 a method for treating hydrocarbon feedstocks derived from waste plastics to meet certain steam cracker feed requirements is further described.

A further pyrolysis process for processing plastic waste is disclosed in the PCT application WO 2018/055555 A1. The disclosed process comprises the steps of converting plastic waste to hydrocarbon liquid and a first $C_{1-4}$ gas; contacting hydrocarbon liquid with a first hydroprocessing catalyst in hydroprocessing unit to yield a second $C_{1-4}$ gas and a first hydrocarbon product comprising $C_{5+}$ liquid hydrocarbons; introducing the first hydrocarbon product to a first separating unit to produce treated hydrocarbon stream comprising $C_{5-8}$ hydrocarbons and a first heavy stream comprising $C_{9+}$ hydrocarbons; contacting the first heavy stream with a second hydroprocessing catalyst in hydrodealkylating unit to yield a second hydrocarbon product comprising $C_{5+}$ liquid hydrocarbons and a third $C_{1-4}$ gas; conveying the second hydrocarbon product to the first separating unit; feeding treated hydrocarbon stream to steam cracker to produce steam cracker product; separating steam cracker product into olefin gas, saturated hydrocarbons gas, aromatics, and a second heavy stream; and conveying the second heavy stream to hydroprocessing unit.

Although pyrolyzation methods for processing plastic waste are well-known in the prior art, said methods still need improvement.

An object of the present invention is therefore to provide an improved process for purifying a pyrolyzed plastic waste.

DESCRIPTION OF THE INVENTION

This object is solved by a process according to claim 1. The dependent claims display advantageous embodiments of the invention.

Surprisingly, it was found that pretreatment of a pyrolyzed plastic waste using activated carbon and subsequently hydrogenating the pretreated plastic waste results in a superior reduction of all impurities present in the pyrolyzed plastic waste. An additional advantage that could be observed during the subsequent hydrogenation step was a de-aromatization, which is particularly beneficial as it converts aromatic compounds present in the pretreated plastic waste into naphthenes that, unlike aromatic, convert into olefins during steam cracking.

According to the present invention, the process for purifying the pyrolyzed plastic waste comprises therefore the steps of:
a) providing the pyrolyzed plastic waste, wherein the pyrolyzed plastic waste is a liquid or a wax at 20° C. and 1 atm;
b) contacting the pyrolyzed plastic waste with activated carbon yielding a pretreated plastic waste; and
c) hydrogenating the pretreated plastic waste using hydrogen and a metal-based catalyst yielding a hydrogenated plastic waste.

The present process enables to remove unwanted impurities, like oxygen, nitrogen, sulphur and chlorine, and at same time increases the stability of the liquid in that di-olefinic and olefinic hydrocarbons present in the liquid are saturated. The pretreatment of the pyrolyzed plastic waste with the activated carbon provides in addition an increased tendency of impurity removal in step c). The hydrogenated plastic waste is preferably suitable for steam cracking. The process is therefore from both, the economical and the environmental point of view advantageous.

In a preferred embodiment, the plastic waste comprises, more preferably consists of, a waste comprising polyolefin, polyvinylchloride, polystyrene or a mixture thereof.

The term "plastic waste" as used herein refers preferably to post-consumer waste plastics, such as polyolefins, polyvinylchloride, polystyrene or mixtures thereof. Typical polyolefin post-consumer waste plastics may comprise polyethylene, namely low-density polyethylene (LDPE), linear low-density polyethylene (LLDPE), high-density polyethylene (HDPE), and polypropylene (PP).

According to the invention, the pyrolyzed plastic waste is a liquid or a wax at 20° C. and 1 atm. A liquid is for example an oil. A wax is defined as a substance which melts above 40° C. at 1 atm. Such pyrolyzed plastic waste comprises different fragments of the long polymer chains of the former post-consumer waste plastic.

The pyrolyzed plastic waste is preferably obtainable via a pyrolysis process, wherein a post-consumer plastic waste, such as polyolefin, polyvinylchloride or a mixture thereof, is fed to a pyrolysis reactor, such as fixed bed, fluidized bed, conical spouted bed, transported bed reactor, stirred tank reactor and/or a kiln-type reactor, and is subsequently pyrolyzed in the presence of a suitable catalyst and at a temperature in the range of 350-600° C. The process conditions may be selected in such a manner that said plastic waste results in a liquid product.

The term "activated carbon" as used therein refers to a porous carbon material that provides a highly developed porous structure and a large specific surface area, preferably in a granular or pellet form. The activated carbon may have a specific surface area (BET) of preferably 100 to 1000 m²/g, more preferably 300 to 700 m²/g, more preferably 500 to 600 m²/g, more preferably 545 to 555 m²/g, more preferably a specific surface area (BET) of 550 m²/g.

Step b) is preferably carried out in a first vessel. The first vessel can be any kind of vessel suitable for contacting the pyrolyzed plastic waste with activated carbon, such as, for example, a steel vessel. Preferably, the first vessel is a vessel comprising a stirrer or mixer or the first vessel is a vessel containing a bed of activated carbon. The stirrer or mixer is used for stirring or mixing the plastic waste and the activated carbon present within the vessel.

The pretreated plastic waste obtained in step b) is preferably transferred from the first vessel to the second vessel for hydrogenating step c). Transferring can, for example, be done via a pipe connecting the first vessel with the second vessel.

In a preferred embodiment, step b) of the inventive process is carried out by mixing the plastic waste and the activated carbon, more preferably by stirring the plastic waste and the activated carbon, or step b) of the inventive process is carried out by flowing the pyrolyzed plastic waste through the bed of activated carbon.

Preferably, step b) is carried out at a temperature in the range of from 5° C. to 100° C., more preferably in the range of from 10° C. to 50° C., more preferably in the range of from 15° C. to 30° C., and most preferably at room temperature and/or step b) is preferably carried out at atmospheric pressure.

Preferably, step b) is carried out with a Weight Hourly Space Velocity (WHSV) of from 0.1 to 110 1/h, more preferably 0.1 to 50 1/h, more preferably 0.1 to 20 1/h, more preferably from 0.1 to 5 1/h, preferably from 0.2 to 3 1/h, more preferably from 0.25 to 1.0 1/h, even more preferably 0.3 1/h, with respect to the amount of the pyrolyzed plastic waste.

Usually, the contacting in step b) is carried out for laboratory scale reactors at higher WHSV, i.e. up to 110 1/h, compared to industrial scale reactors.

The WHSV for step b) is calculated as follows:

$$WHSV\left(\frac{1}{h}\right) = \frac{\text{amount pyrolyzed plastic waste (g)}}{(\text{amount activated carbon(g)}) \cdot \text{time(h)}}$$

Preferably, step b) is carried out prior to step c).

Preferably, step b) is carried out under conditions different from the conditions at which step c) is carried out, with the conditions being temperature and/or pressure. Preferably, step b) is carried out at a temperature which is lower than the temperature at which step c) is carried out and/or step b) is carried out at a pressure which is lower than the pressure at which step c) is carried out.

Step c) is preferably carried out in a second vessel, the second vessel preferably being a reactor. The second vessel, preferably the reactor, can be any kind of vessel or reactor, respectively, suitable for hydrogenating the pretreated plastic waste using hydrogen and a metal-based catalyst. The reactor is preferably a laboratory scale reactor, such as an autoclave reactor, or an industrial scale reactor.

Step b) and step c) are preferably not carried out in the same vessel. In other words, step b) and step c) are preferably separated steps, in particular spatially separated steps, preferably with step b) being carried out in a first vessel and step c) in a second vessel.

Preferably, the first vessel is other than the second vessel.

The hydrogenation of the pretreated plastic waste is conducted in the presence of a metal-based catalyst. The catalyst may be any catalyst that is capable of hydrogenating, i.e. saturating the olefin, di-olefin and the aromatic compounds present in the pretreated plastic waste liquid. Suitable metal-based catalysts may therefore comprise at least one metal and a carrier. The carrier may further comprise, preferably consists of, a compound selected from a list consisting of silica, carbon and/or metal oxide and mixtures thereof.

The carrier used for the metal-based catalyst may have a specific surface area (BET) of preferably 100 to 1000 m²/g, more preferably 200 to 300 m²/g, more preferably of 220 to 280 m²/g, more preferably of 250 m²/g. The BET is measured according to ASTM D3663.

The term "metal oxide" as used therein refers to oxides of one of the metals selected from the group 4-13 metals.

In a preferred embodiment, the carrier comprises, more preferably consists of, a metal oxide of group 13, most preferably comprises or consists of alumina, preferably in the form $Al_2O_3$.

The average particle size of the carrier may vary within a broad range. A preferred range is the range of 1 to 5 mm, more preferably 2 to 4 mm, more preferably 2.5 to 3.5 mm, more preferably 3 mm.

The average pore volume of the carrier may vary within a broad range. A preferred range is the range of 0.50 to 1.5 mL/g, more preferably 0.80 to 1.1 mL/g, and most preferably 1.00 mL/g.

The metal of the metal-based catalyst may comprise, preferably is, a metal selected from a group 6 metal and/or a list of group 9-11 metals, more preferably comprises, still more preferably consists of a metal selected from a group 6 metal and/or a list of group 10 metals. These metals include cobalt (Co), molybdenum (Mo), rhodium (Rh), Iridium (Ir), nickel (Ni), palladium (Pd), platinum (Pt), copper (Co), silver (Ag) and/or gold (Au).

In a preferred embodiment, the metal of the metal-based catalyst comprises, preferably consists of, palladium.

In a further preferred embodiment, the metal of the metal-based catalyst may comprise a combination of at least two metals from the group of transition metals, such as nickel and cobalt (Ni—Co) or cobalt and molybdenum (Co—Mo).

The amount of the metal within the metal-based catalyst should not exceed the value of 10 wt. %, preferably 7.5 wt. % and more preferably 6 wt. %. If the contents of the metal are too high within the metal-based catalyst, the hydrogenation reaction may be compromised. On the other hand, the content of the metal within the metal-based catalyst should not be too low. The amount of the metal within the metal-based catalyst is therefore at least 0.1 wt. %, preferably at least 0.5 wt. %, more preferably at least 1 wt. %, preferably the amount is in the range of 3.3-3.7 wt. %, more preferably 3.5 wt. %, still more preferably in the range of 3.8 to 4.2 wt. %, as for example 4 wt. %.

In a preferred embodiment, the metal-based catalyst comprises the metal in an amount of 4.8 to 5.2 wt. %, most preferably of 5 wt. %, wherein the metal comprises, or consists of, preferably palladium.

The metal-based catalyst can be prepared for example by preparing a solution from the metal component using a volatile solvent, and then contacting the metal-solution with the corresponding carrier and evaporating the solvent.

To enhance the activity of the metal-based catalyst used for the hydrogenating of the pretreated plastic waste, said catalyst is preferably pre-activated, more preferably pre-activated in the presence of hydrogen. The metal-based catalyst may be activated by contacting the catalyst with an activation stream comprising the hydrogen. The hydrogen may be provided as gas with a pressure of 10 to 50 bar, preferably 20 to 40 bar, more preferably 25 to 35 bar, and most preferably of 28 to 32 bar, for example 30 bar.

A favorable temperature at which the metal-based catalyst is pre-activated may be up to 350° C., preferably up to 300° C. and more preferably up to 275° C. In one embodiment, the temperature is chosen from 150 to 350° C., preferably from 200 to 300° C., more preferably from 225 to 275° C. In a preferred embodiment, the metal-based catalyst is pre-activated at a temperature from 245° C. to 255° C., most preferably of 250° C.

The metal-based catalyst may be pre-activated for a period of time that is between 0.5 and 4.0 h, preferably between 1.0 and 3.5 h, more preferably between 2.0 and 3.0 h, and most preferably for 2.5 h.

Alternatively, the metal-based catalyst may be sulphided by contacting the catalyst with a gas-stream comprising one or more sulphides together with hydrogen in a carefully controlled temperature schedule for a specific period of time sufficient to activate the metal-based catalyst.

In a preferred embodiment, the hydrogen for conducting the hydrogenating step c) of the pretreated plastic waste is provided as gas with a pressure up to 100 bar, preferably up to 50 bar, more preferably up to 40 bar, and more preferably up to 35 bar. In one embodiment, the hydrogen is provided as a gas with a pressure of 10 to 50 bar, preferably 20 to 40 bar, more preferably 25 to 35 bar. In a most preferred embodiment, the hydrogen gas is provided with a pressure of 30 bar.

The temperature at which hydrogenating according to step c) is carried out has a strong influence on the chemical reaction kinetic. The temperature therefore may be at least 200° C., preferably at least 250° C., and more preferably at least 280° C. On the other hand, the temperature should not exceed a value of 400° C., preferably a value of 350° C., and more preferably a value of 320° C.

In a most preferable embodiment, the temperature at which the hydrogenating according to step c) is carried out is in the range of 290° C. to 310° C., for example 300° C.

Preferably, in the step c) hydrogenating is carried out at a Weight Hourly Space Velocity (WHSV) of from 0.1 to 50.0 1/h, more preferably 0.1 to 5.0 1/h, preferably from 0.2 to 3.0 1/h, more preferably from 0.3 to 2.0 1/h, even more preferably from 0.8 to 1.2 1/h, with respect to the amount of the pretreated plastic waste.

Usually, the hydrogenation in step c) is carried out for laboratory scale reactors at higher WHSV, i.e. up to 50 1/h, compared to industrial scale reactors.

The WHSV for step c) is calculated as follows:

$$WHSV\left(\frac{1}{h}\right) = \frac{\text{amount pretreated plastic waste (g)}}{(\text{amount metal}-\text{based catalyst(g)}) \cdot \text{time(h)}}$$

EXAMPLES

For the analysis of the pyrolyzed plastic waste a GC-MS (gas chromatography-mass spectrometry) and a GC-AED (gas chromatography-atomic emission detector) have been used.

The GC-MS analysis was performed on Agilent GC 6890 with MSD 5975B inert XL. The GC column was Agilent DB1 (60 m×0.25 mm i.d., film thickness 1.0 μm). The temperature of the column was held at 40° C. for 3 min and raised to 320° C. (5° C./min) and be held for 10 min. The injector was maintained at 350° C. with split ratio of 30:1. Injection volume of liquid sample was 1 μL. The carrier gas was helium and was set at a constant flow rate of 1 mL/min.

The GC-AED analysis was performed on Agilent GC-7890A with JAS AED. The GC column was Agilent DB1 (60 m×0.25 mm i.d., film thickness 1.0 μm). The temperature of the column was held at 40° C. for 3 min and raised to 320° C. (5° C./min) and be held for 10 min. The injector was maintained at 350° C. with split ratio of 10:1. Injection volume of liquid sample was 1 μL. The carrier gas was helium and was set at a constant flow rate of 1 mL/min. The reagent gases were O2, H2 and 10% CH4/90% N2 for oxygen.

A first set of experiments was conducted in a laboratory batch hydrogenation reactor.

Example 1

3 g of a commercially available activated carbon from CarboTech AC GmbH with a surface area of 550 m$^2$/g were added to 60 ml of pyrolysis oil, obtained from pyrolysis of non-recyclable, post-consumer mixed polyolefin waste with polyethylene, polypropylene and polystyrene as main constituents. The solution was then stirred for 1 h at room temperature.

Example 2

A Palladium-Alumina catalyst with 5 wt. % Pd was pre-activated for 1 hour under 30 bar of hydrogen at 250° C. The solution of example 1 (~40 ml) was then added to an autoclave reactor upon 0.9 g of the preactivated catalyst. 30 bar of hydrogen was added and the solution was heated up to 300° C. under stirring. A constant supply of 30 bar hydrogen was provided.

TABLE 1

| Examples | Catalyst [g] | Activated Carbon [g] | Volume solution [ml] | Temp. [° C.] | Time [h] | WHSV [1/h] | H$_2$ feed |
|---|---|---|---|---|---|---|---|
| 1 | 0 | 3 | 60 | 25 | 1 | 18 | none |
| 2 | 0.9 | 0 | 40 | 300 | 1 | 40 | continuous |

N.B.: a continuous H$_2$ feed indicates a constant H$_2$ feeding to the reactor (H$_2$ valve to the reactor open)

The liquid was subsequently analysed via GC-MS and also GC-AED. The tables 2 and 3 present the hydrogenation on chemicals.

TABLE 2

|  | 3-methylhexa-2.4-diene | | 3-methylhexane | |
| --- | --- | --- | --- | --- |
| Examples | Retention time (min) | Area % | Retention time (min) | Area % |
| Original | 19.68 | 0.09 | 12.70 | 0 |
| 2 | 19.68 | 0.03 | 12.70 | 0.03 |

TABLE 3

|  | toluene | | methylcyclohexane | |
| --- | --- | --- | --- | --- |
| Examples | Retention time (min) | Area % | Retention time (min) | Area % |
| Original | 19.25 | 0.77 | 17.90 | 0.07 |
| 2 | 19.25 | 0.56 | 17.90 | 0.14 |

The analysis of the identified impurities (N, S, Cl and O) and the effect of the precontact with activated carbon is presented in the table 4 below.

TABLE 4

| Examples | Total N [ppm] | Total S [ppm] | Total Cl [ppm] | Total O [ppm] |
| --- | --- | --- | --- | --- |
| Original | 912 | 0.7 | 531.3 | 1630.4 |
| 1 | 877.5 | 0.3 | 400.5 | 1531.2 |
| 2 | 521.8 | 0.0 | 58.8 | 1190.0 |

A further set of experiments was conducted in a laboratory batch hydrogenation reactor to analyze the several parameters such as amount of catalyst, reaction time, temperature of reaction, hydrogen feed.

Examples 3-7

A Palladium-Alumina catalyst with 5 wt. % Pd was pre-activated for 1 hour under 30 bar of hydrogen at 250° C. The solution of example 1 was then added to an autoclave reactor upon the preactivated catalyst. Hydrogen was added and the solution was heated under stirring. The examples 3 to 7 are recorded in table 5.

TABLE 5

| Examples | Catalyst [g] | Volume solution [ml] | Temp. [° C.] | Time [h] | WHSV [1/h] | $H_2$ feed |
| --- | --- | --- | --- | --- | --- | --- |
| 3 | 0.5 | 50 | 250 | 1 | 90 | discontinuous |
| 4 | 0.9 | 50 | 250 | 1 | 50 | discontinuous |
| 5 | 0.9 | 50 | 300 | 1 | 50 | discontinuous |
| 6 | 0.9 | 50 | 300 | 2.5 | 20 | discontinuous |
| 7 | 0.9 | 50 | 300 | 4 | 12.5 | continuous |

N.B.: in table 5, the discontinuous $H_2$ feed corresponds to one filling of the reactor with hydrogen ($H_2$ valve to the reactor closed). A continuous $H_2$ feed indicates a constant $H_2$ feeding to the reactor ($H_2$ valve to the reactor open).

The liquids of the examples 3 to 7 were subsequently analysed via GS-MS and also GC-AED. The tables 6 to 8 present the hydrogenation on chemicals.

TABLE 6

|  | 3-methylhexa-2.4-diene | | 3-methylhexane | |
| --- | --- | --- | --- | --- |
| Examples | Retention time (min) | Area % | Retention time (min) | Area % |
| Original | 19.68 | 0.09 | 12.70 | 0.13 |
| 3 | 19.68 | 0.1 | 12.70 | 0.26 |
| 4 | 19.68 | 0.08 | 12.70 | 0.37 |
| 5 | 19.68 | 0.05 | 12.70 | 0.40 |
| 6 | 19.68 | 0.06 | 12.70 | 0.40 |
| 7 | 19.68 | 0.04 | 12.70 | 0.51 |

TABLE 7

|  | heptene | | heptane | |
| --- | --- | --- | --- | --- |
| Examples | Retention time [min] | Area % | Retention time [min] | Area % |
| Original | 16.24 | 0.48 | 16.73 | 0.38 |
| 3 | 16.24 | 0.12 | 16.73 | 0.51 |
| 4 | 16.24 | 0.03 | 16.73 | 0.78 |
| 5 | 16.24 | 0.02 | 16.73 | 0.82 |
| 6 | 16.24 | 0.17 | 16.73 | 0.64 |
| 7 | 16.24 | 0.04 | 16.73 | 0.90 |

TABLE 8

|  | toluene | | methylcyclohexane | |
| --- | --- | --- | --- | --- |
| Examples | Retention time [min] | Area % | Retention time [min] | Area % |
| Original | 19.25 | 0.77 | 17.90 | 0.07 |
| 3 | 19.25 | 0.7 | 17.90 | 0.09 |
| 4 | 19.25 | 0.62 | 17.90 | 0.12 |
| 5 | 19.25 | 0.69 | 17.90 | 0.11 |
| 6 | 19.25 | 0.71 | 17.90 | 0.11 |
| 7 | 19.25 | 0.63 | 17.90 | 0.16 |

The analysis of the identified impurities (N, S, Cl and O) is presented in the table 9 below.

TABLE 9

| Examples | Total N [ppm] | Total S [ppm] | Total Cl [ppm] | Total O [ppm] |
| --- | --- | --- | --- | --- |
| Original | 912 | 0.7 | 531.3 | 1630.4 |
| 3 | 1072.0 | 0.4 | 257.6 | 1586.0 |
| 4 | 1160.4 | 0.0 | 184.7 | 1457.6 |
| 5 | 756.1 | 0.0 | 122.4 | 1290.6 |
| 6 | 671.2 | 0.0 | 66.8 | 1116.6 |
| 7 | 647.4 | 0.0 | 83.2 | 1360.5 |

The term "Original" in the tables above refer to the non-treated pyrolysis oil.

The invention claimed is:

1. A process for purifying a pyrolyzed plastic waste, the process comprising the steps of:
  a) providing the pyrolyzed plastic waste, wherein the pyrolyzed plastic waste is a liquid or a wax at 20° C. and 1 atm;
  b) contacting the pyrolyzed plastic waste with activated carbon yielding a pretreated plastic waste, wherein step b) is carried in a first vessel and step b) is carried out at a temperature in the range of from 5° C. to 100° C.;

c) hydrogenating the pretreated plastic waste using hydrogen and a metal-based catalyst yielding a hydrogenated plastic waste, wherein step c) is carried out in a second vessel.

2. The process according to claim 1, wherein the plastic waste comprises a waste comprising polyolefin, polyvinylchloride, polystyrene or a mixture thereof.

3. The process according to claim 1, wherein the metal-based catalyst comprises at least one metal and a carrier.

4. The process according to claim 3, wherein the carrier comprises a compound selected from a list consisting of silica, carbon and/or metal oxide and mixtures thereof.

5. The process according to claim 3, wherein the carrier comprises alumina.

6. The process according to claim 3, wherein the metal of the metal-based catalyst comprises a metal selected from a group 6 metal and/or a list of group 9-11 metals.

7. The process according to claim 6, wherein the metal of the metal-based catalyst comprises a metal selected from a list of group 10 metals.

8. The process according to claim 7, wherein the metal of the metal-based catalyst comprises palladium.

9. The process according to claim 3, wherein the metal-based catalyst comprises the metal in an amount of between 0.1 and 10 wt. %.

10. The process according to claim 1, wherein the metal-based catalyst is pre-activated.

11. The process according to claim 10, wherein the metal-based catalyst is pre-activated in the presence of hydrogen.

12. The process according to claim 1, wherein the step c) of hydrogenating is carried out at a temperature of from 200 to 400° C.

13. The process according to claim 1, wherein the step c) of hydrogenating is carried out at a Weight Hourly Space Velocity (WHSV) of from 0.1 to 100.0 1/h with respect to the amount of the pretreated plastic waste.

14. The process according to claim 1, wherein the hydrogen for conducting the hydrogenating step c) of the pretreated plastic waste is provided as gas with a pressure up to 100 bar.

15. The process according to claim 1, wherein the step b) is carried out with a Weight Hourly Space Velocity (WHSV) of from 0.1 to 50.0 1/h with respect to the amount of the pyrolyzed plastic waste.

* * * * *